(12) United States Patent
Kawamura (10) Patent No.: US 9,806,575 B2
(45) Date of Patent: Oct. 31, 2017

(54) PERMANENT-MAGNET AC POWER GENERATOR

(71) Applicants: Hideo Kawamura, Kanagawa (JP); Megumi Kawamura, Kanagawa (JP)

(72) Inventor: Hideo Kawamura, Kanagawa (JP)

(73) Assignee: Megumi Kawamura, Kanagawa (JP)

( * ) Notice: Subject to any disclaimer, the term of this patent is extended or adjusted under 35 U.S.C. 154(b) by 0 days.

(21) Appl. No.: 14/424,183

(22) PCT Filed: Aug. 30, 2013

(86) PCT No.: PCT/JP2013/005139
§ 371 (c)(1),
(2) Date: Oct. 28, 2015

(87) PCT Pub. No.: WO2014/034136
PCT Pub. Date: Mar. 6, 2014

(65) Prior Publication Data
US 2016/0043601 A1 Feb. 11, 2016

(30) Foreign Application Priority Data

Aug. 30, 2012 (JP) ................................ 2012-190249

(51) Int. Cl.
*H02K 1/27* (2006.01)
*H02K 11/04* (2016.01)
(Continued)

(52) U.S. Cl.
CPC ............. *H02K 3/28* (2013.01); *H02K 1/2786* (2013.01); *H02K 11/0094* (2013.01);
(Continued)

(58) Field of Classification Search
CPC .... H02K 1/2786; H02K 3/28; H02K 11/0094; H02K 11/046; H02K 21/00; H02K 21/48; H02P 9/02
(Continued)

(56) References Cited

U.S. PATENT DOCUMENTS 8,823,333 B2 9/2014 Kawamura
2002/0113515 A1* 8/2002 Umeda .................... H02K 3/28
310/184
(Continued)

FOREIGN PATENT DOCUMENTS

CN 1372370 A 10/2002
JP H09-51646 2/1997
(Continued)

OTHER PUBLICATIONS

"Voltage Regulator", Analog Devices Inc., 2009.*
(Continued)

*Primary Examiner* — John K Kim
(74) *Attorney, Agent, or Firm* — Troutman Sanders LLP (57) ABSTRACT

The present invention relates to a plurality windings of U phase corresponding to one magnetic pole including first and second windings wound in a short pitch winding manner. The winding starts of the first and second windings are shifted by at least one tooth. The windings are wound so that a winding angle occupied by the windings inter-slot angle from the winding start of the first winding to the winding end of the second winding corresponds to a pole angle. The windings in the V phase are disposed in the same relationship as in the U phase at the position delayed by an electric angle of 120 degrees with respect to the U phase, and those in the W phase are disposed at the position delayed by an
(Continued)

additional 120 degrees. The outputs of the windings are then each rectified, subsequently joined together and used by adding currents.

8 Claims, 8 Drawing Sheets

(51) Int. Cl.
    *H02K 21/00* (2006.01)
    *H02K 3/28* (2006.01)
    *H02K 21/48* (2006.01)
    *H02P 9/02* (2006.01)
    *H02K 11/00* (2016.01)

(52) U.S. Cl.
    CPC .......... *H02K 11/046* (2013.01); *H02K 21/00* (2013.01); *H02K 21/48* (2013.01); *H02P 9/02* (2013.01)

(58) Field of Classification Search
    USPC ........ 310/68 D, 68 R, 156.08, 179, 180, 184
    IPC .................. H02K 1/27, 11/00, 11/04, 21/00
    See application file for complete search history.

(56) References Cited

U.S. PATENT DOCUMENTS

| | | | | |
|---|---|---|---|---|
| 2005/0206263 A1* | 9/2005 | Cai | .......................... | H02K 3/12 310/198 |
| 2007/0090713 A1* | 4/2007 | Arita | .................... | H02K 21/042 310/181 |
| 2008/0157622 A1* | 7/2008 | Shah | ........................ | H02K 3/28 310/184 |
| 2010/0207480 A1* | 8/2010 | Reutlinger | ........... | H02K 21/042 310/181 |
| 2013/0113442 A1 | 5/2013 | Kawamura | | |
| 2016/0043601 A1* | 2/2016 | Kawamura | ............ | H02K 21/48 310/156.08 |

FOREIGN PATENT DOCUMENTS

| | | |
|---|---|---|
| JP | 2006-067674 | 3/2006 |
| JP | 4463872 B1 | 5/2010 |
| JP | 4712896 B1 | 6/2011 |
| JP | 2012-023815 A | 2/2012 |
| JP | 4913234 | 4/2012 |
| JP | 2012-130151 | 7/2012 |

OTHER PUBLICATIONS

International Search Report dated Oct. 29, 2013, which issued during prosecution of International Application No. PCT/JP2013/005139, which corresponds to the present application.

Yoji Takeda, et al., "Umekomi-Jishaku-Doki-Mota-No-Sekkei-To-Seigyo" (Design and control of Interior permanent magnet synchronous motor), First Edition, First Issue, Oct. 25, 2001.

Japanese Office Action dated Sep. 17, 2013 issued in corresponding Japanese Patent Application No. 2012-190249.

Decision of Rejection dated Dec. 25, 2013 issued in corresponding Japanese Patent Application No. 2012-190249.

Chinese Office Action dated Nov. 4, 2016 issued in corresponding Chinese Application No. 201380045388.0.

* cited by examiner

PERMANENT-MAGNET AC POWER GENERATOR

CROSS REFERENCE TO RELATED APPLICATIONS

This application is a U.S. National Phase Application under 35 U.S.C. §371 of International Patent Application PCT/JP2013/005139 filed Aug. 30, 2013, which claims priority to Japanese Patent Application No. 2012-190249 filed Aug. 30, 2012. The International Application was published on Mar. 6, 2014, as International Publication No. WO 2014/034136 under PCT Article 21(2). The entire contents of these Applications are hereby incorporated herein by reference.

TECHNICAL FIELD

The present invention relates to a stator winding of permanent-magnet AC generator including a stator attached to a housing, and a rotor provided with permanent magnet members that rotate wish respect the stator.

BACKGROUND ART

Conventionally, the permanent magnet materials have been adopted for the rotor of generator in order to improve the efficiency. The strong point of the permanent magnet generator has high power in spite of low speed conditions because of having strong magnetic power. But, as the voltage of permanent magnet generator increases in proportion to revolution speed because of having constant magnetic force, the voltage raises too much at high speed conditions and it is very difficult to control the voltage constantly. However, recently the control of the voltage has been realized see, Japanese Patent Nos. 4463872, 4712896, and 4913424) by the simple control system which was invented by the inventor of this patent. As the result, reducing size of generator is required for next subject. Then it is very convenient technology.

For example, the smaller the size of generator is, the better ability of assemble is, then it is very convenient. Moreover, the demand of electric power is increasing very much therefore power up and down sizing are required more and more.

In addition, in the electro-magnetic generator which has been used for conventional vehicles, electro-magnetic force is generated by current flown in the rotor, and the electromotive force is produced in the winding of stator mounted on outer periphery of rotor and electric power is produced. However, the electric generator has a problem that it is very difficult to get high power at low speed condition because the magnetic power of the rotor is too low. Then they adopted a transmission in order to increase rotating speeds of generator and get high power at low speed condition. As increasing generator speed has been limited, then the generator size increases gradually. However, the increase of generator size is also limited and a shortage of generating power is very big problem for drivers because of experience battery die.

In addition, the permanent magnet generators for the vehicle have been studied to realize many times, however, the size of the generator became too large in order to get necessary power, and they have not succeeded in developing a generator with extreme small size, then, they have given up to install the permanent magnet generator into vehicles. However, recently IPMSM (Interior Permanent Magnet Synchronous Motor) generator which is made by soft magnetic material for the rotor and inserted permanent magnetic members, has been developed (see, Non patent literature Ohm-sha "*Umekomi-jishaku doki-mota-no sekkei to seijyo* (Design and control of Interior permanent magnet synchronous motor)" TAKEDA Yuji, et al.) and they have succeeded in to increase the torque at low speed condition. In this IPMSM, the electrical magnetic force is produced by a current and it is added to permanent magnetic force in the rotor produced by the soft magnetic material. As the results, the magnetic force summed up the electric and permanent magnet force increase large and the system is used for the synchronous motor in the hybrid vehicle because the systems have the specific characteristics of the high efficiency, compact size and light weight compared with a conventional induction motor. The IPMSM can be used for generator.

SUMMARY

However, it is very difficult to increase the electric power in the permanent magnet generator having compact size and simple controller and there are nothing a practicable and epoch-making technology. In addition, it is possible to use the IPMSM for generator, but the control system is very complicate and the control system have to consisted by many parts, as the result, the cost of the system become very expensive. Especially, IPMSM used much rear earth has a defect because it become very expensive.

Then the explanation is carried out by use of theoretical equation why it is difficult to increase the power of permanent magnet generator without size up the generator. The electromotive power of the PM generator is decided by characters which are strength of magnetic force, frequency, and number of winding of stator coils. Namely the power is decided by multiplied the electromotive voltage by current which are calculated by equation 1 and equation 2. In the equation, following fact is cleared that the electromotive voltage has a relation with flowing current and impedance of the windings.

$$E = 4.44 \times \Phi \times f \times Ws \qquad \text{(Equation 1)}$$

E: Electromotive voltage
Φ: Magnetic force
f: Frequency, and
Ws: Number of windings $$E = I \times (R^2 + (2\pi f L/1000)^2)^{1/2} \qquad \text{(Equation 2)}$$

I: Current
R: Resistance of windings
L: Inductance of windings

Therefore, when the number of winding increase, the voltage become large, and when the impedance of coil which is a function of the number of winding coil is small, the current and power increase. However, it is difficult to increase the electromotive voltage and power even if they change many kind of winding method in the conventional winding methods, which is clear as shown in equation 1 and 2. Of course, the magnetic force Φ is increase by reducing resistance of the magnetic passage and at the same time permeance coefficient is increase. Then, they have tried to change and modify the material of stator, shape, winding method in order to increase the power of the generator; however the effect of power improvement is a little. Furthermore, if the number of winding coils is increased, the inductance of the windings do not changed and the electromotive voltage almost never change, even if the resistance of coils reduce.

In addition, in order to increase generating current for electromotive force, its need to reduce the inductance of windings which is shown in equation 2. The value of inductance is calculated by the equation 3 shown as fellows.

$$L = A \cdot \mu \cdot N^2 / l \quad \text{(Equation 3)}$$

L: Inductance
A: Area of steel core wound by windings
μ: Coefficient of permeability
N: Number of windings
l: Length of magnetic passage According to studying the equation 3, as there is no method reducing the inductance L drastically without changing the winding number, it is clear that it is difficult to make the power of generator increase without increasing the size of it.

The purpose of this invention is that it is offered to make the power of permanent magnet generator made increase by using simple technical method and keeping small size.

In order to achieve the purpose, the inventor carried out many explanations and studies. At the beginning, the two bundle of stator windings are wound in same teeth and phase and conformed if the power or generating current increase twice in the experience. In the case of winding two windings into same teeth, the electrical resistance of windings reduced owing to increase number of windings, however inductance of the windings was same as single winding and the electromotive voltage also no change from single winding. Namely, in the case of the winding method which has same winding number and same inductance, it could not increase twice current. However, when two windings are wound by shifted the phase angle, it was cleared having the characteristic that the each electromotive voltage was generated in each winding independently, because the passage timing of magnetic flux is shifted (the passage pattern passed into the winding change according to shifting the phase position). And when the generating power of each winding is added, the generating power increases to twice.

The invention is based on the knowledge shown in the above, a rotor shaft rotatably supported by a housing; a rotor fixed to the rotor shaft and mounted with a plurality of permanent magnet members on an outer periphery side 48; and a stator disposed at the outside of the rotor with a winding; the permanent-magnet AC generator having a switching mechanism that controls a voltage to be constant. Wherein teeth of stator corresponding to poles of rotor are provided, the number of the teeth being more than 3 and the integral multiple of more than 2, the winding of stator includes a plurality windings and the plurality of windings are wound such that a winding angle occupied by the plurality of windings, which are wound at a short pitch with the teeth, and shifted the tooth, around which the plurality of windings are wound, corresponds to a pole angle, moreover AC electric power which generate in plurality windings are rectified from AC to DC current in a rectifier independently, and join together the currents in the connection wires moreover the DC current added together is used for power.

Wherein the generator has plurality phases, teeth of stator corresponding to poles of rotor are provided, the number of the teeth being the integral multiple of more than 2, the winding of stator corresponding to poles of rotor includes a plurality windings are wound at a short pitch with the teeth, and the angle occupied the plurality windings which is wound shifted the tooth corresponds to a pole angle, still more, windings after phase of the first phase with plurality windings is installed the position delayed the angle divided electric angle 360 degrees by number of phase each, it is nice constitution.

Wherein in the case of the generator having plurality phases, teeth of stator corresponding to poles of rotor are provided, the number of the teeth being the integral multiple of more than 2, and the windings corresponded to one pole has same number of the integral number, still more, the winding is wound by striding the teeth which is subtracted one from the number of teeth corresponded to one pole of rotor, which are wound at a short pitch with the teeth, shifted one tooth, and around which the plurality of windings are wound, corresponds to a pole angle, then, windings after phase of the first phase with plurality windings is installed the position delayed the angle divided electric angle 360 degrees by number of phase each, it is nice constitution.

In the case of generator having 3 phase, the number of teeth corresponded to a magnetic pole of rotor are six, the windings of stator corresponded to one magnetic pole are provided first and second winding, the winding is wound by striding 5 tooth, shifted one tooth and short pitch winding each other, and the angle occupied by the first and second winding is corresponded to the angle formed by magnetic pole, still more, first and second winding of V phase are wound to behind electric angle 120 degrees from winding position of first and second winding of U phase and first and second winding of W phase are wound to behind electric angle 120 degrees from winding position of first and second windings of V phase, it is nice constitution.

In the case of motor and generator having 3 phase, the number of teeth corresponded to a magnetic pole of rotor are nine and windings corresponded to a magnetic pole of rotor are consisted by three pieces which are first, second and third winding, still more, the winding is wound by striding seven teeth, short pitch winding, and shifted one tooth and the angle occupied by the first, second and third winding is corresponded to the angle formed by magnetic pole, then, first, second and third winding of V phase are wound to behind electric angle 120 degrees from winding position of first, second and third winding of U phase, and first, second and third winding of W phase are wound to behind electric angle 120 degrees from winding position of first and second windings of V phase, it is nice constitution.

In the case of single phase generator, the teeth of stator corresponded to a magnetic pole of rotor are three, and the windings of stator are provided first and second windings, still more, the windings are wound by shifting one tooth and short pitch winding with the teeth, it is nice constitution.

AC electric power which generate in plurality winding windings are rectified from AC to DC current in a rectifier independently, and join together the currents in the connection wires, it is nice constitution The controller make current flow into the plurality windings corresponded to one magnetic pole at the timing corresponded to shifting winding position of each windings and each phase position delayed from the before phase, then, the total magnetic force produced by the plurality windings react to the magnetic force of permanent magnet and grow the large torque for driving a motor.

In the permanent magnet generator according to this invention, it is possible to increase twice the electric power by the simple method and structure of winding shown as follows. Teeth of stator corresponding to poles of rotor are provided, the number of the teeth being more than 3 and the integral multiple of more than 2, the winding of stator includes a plurality windings and the plurality of windings are wound such that a winding angle occupied by the plurality of windings, which are wound at a short pitch with the teeth, and shifted the tooth, around which the plurality of windings are wound, corresponds to a pole angle.

Namely, the electric power is increased twice or triple or more over by using the invention compared with conventional generators without increasing the size of generator, which the technology is that it make the number of teeth and slot increase, moreover, the teeth of stator are corresponding poles of rotor are provided and the plurality windings for example 2 or 3 kinds of windings are wound into the slots corresponding one pole by shifted the teeth position in spite of simple structure.

After all, the electromotive voltage generated in the stator windings of the permanent magnet generator is decided by the magnetic force having the permanent magnets, the frequency, and the number of windings. In addition, the magnetic force is no related with the number of teeth and it is rerated with the sum of magnetic flux which flow into the teeth. Then, when the distribution of the magnetic flux was investigated, it was cleared that the magnetic flux flowing in the side of magnetic member was small, and maximum magnetic flux was observed in central position of magnetic member. Furthermore, in the case of six teeth corresponded a pole of the rotor, the magnetic force flow into four teeth positioning in central position is maximum, the flux flowing in the both ends of the teeth is a little small, therefore, the total magnetic force flowed in 5 teeth is no different from the total magnetic force flowed in six teeth.

In the case of explanation by using equation 1, the electromotive voltage is shown next calculation which is $E1=5/6 \cdot E$, if the measure of magnetic force reduce in proportion to the number of teeth, however, the electromotive voltage in the case of double windings is shown as follow calculation that $E2=2 \times (5/6) \cdot E$ then, the power of the generator will be increased about 70% in the calculation. However, the inventor took twice power in the explanations. The reason of increasing twice power is that the magnetic flux flowing in the central position is generally large and both ends of teeth is small, namely, the magnetic flux flown from the member is not uniform in the case of the plurality teeth corresponded a pole of rotor, as the result those magnetic force are no effect on reduction of the total power because magnetic force flown into boss side of teeth is a little small, if the coils is wound by short pitch winding with the teeth.

Then, it is very effective method to increase the power without increasing the size in the generator which plurality windings corresponded a pole of rotor is wound in the slots, and shifted the position of winding, as the result, it is made the winding generate current independently, still more, it is made the current add together. And in the case of permanent-magnet AC generator according to this invention, AC electric power which generate in plurality windings are rectified from AC to DC current in a rectifier independently, and join together the currents in the connection wires moreover the DC current added together is used for power.

In the permanent-magnet AC generator according to another example, as it is possible that as the plurality windings are wound in the teeth corresponded to a pole of rotor without reducing the number of teeth, reduction of flowing the magnetic flux into the windings is controlled, and reduction of electromotive voltage is also controlled as the result the power of generation increase, it is very effective technology.

In the permanent-magnet AC generator according to a further example, as the plurality winding can be inserted to the all of slots uniformity without reducing the number of teeth, the power can be increased more than twice or more than twice, still more, as producing the unevenness of the magnetic flux which act the windings is little, it is possible to reduce occurring cogging torque.

In the permanent-magnet AC generator having three phase according to another aspect of the invention, as the double windings are inserted to the all of slots uniformity and it is possible to flow the magnetic flux uniformity without reducing the number of teeth, it can increase the power more than twice, still more, as producing the unevenness of the magnetic flux which act the windings is little, it is possible to reduce occurring cogging torque.

In the permanent-magnet AC generator having three phases according to a yet further example, as the triple windings are inserted into all of slots corresponded to the one pole of rotor uniformity without reducing the number of teeth wound the windings and it is possible to flow the magnetic flux uniformity, the power increases more than triple, still more, as producing the unevenness of the magnetic flux which act the windings is little, it is possible to reduce occurring cogging torque.

In the permanent-magnet AC generator according to an additional example, it is possible to increase the electric power more than double in the generator having single phase which is consisted by same winding method.

In the permanent-magnet AC generator according to an aspect of the invention, the AC electric power generated in the windings of stator are rectified in the rectifiers independently, then the DC currents are joined in the wires connected with, as the result, it is possible to increase the electric power twice, triple or more than those without producing a circulation current between the two or three windings. Of course, in the case of connection with each other's winding of the phase between the output of generator and input of motor directory for driving for example in the case of using a generator with two kind of windings and motor with two kind of winding, the first windings of generator are connected with the first winding of motor and the second windings of generator are connected with the second winding of motor, in the case circulation current did not produce. Therefore, it is not essential condition for using the AC permanent magnet generator as the each current generated in the windings are rectified and join in the wires connected with to add together the DC current, in spite of desirable condition for increasing the power of the permanent-magnet AC generator.

In the permanent-magnet AC generator according to an example, in the case of using the permanent-magnet AC generator for the motor driven by flowing current, the controller make the current flow into the plurality windings corresponded to one pole which current is flown into delayed point in the corresponded to winding angle of each windings and discrepancy of plurality windings, which is in the shifted and delayed position, as the result, compounded magnetic force which is produced by the current flowed in the plural stator windings react to the permanent magnetic force of each phase and it made the motor drive by strong torque, as the result it is possible that the driving force for the motor increase double.

DETAILED DESCRIPTION OF THE INVENTION

A structure of permanent-magnet AC generator having the plurality windings to increase power with small size with the present invention will be herein-after described with reference to the accompany drawing.

Figure 1:
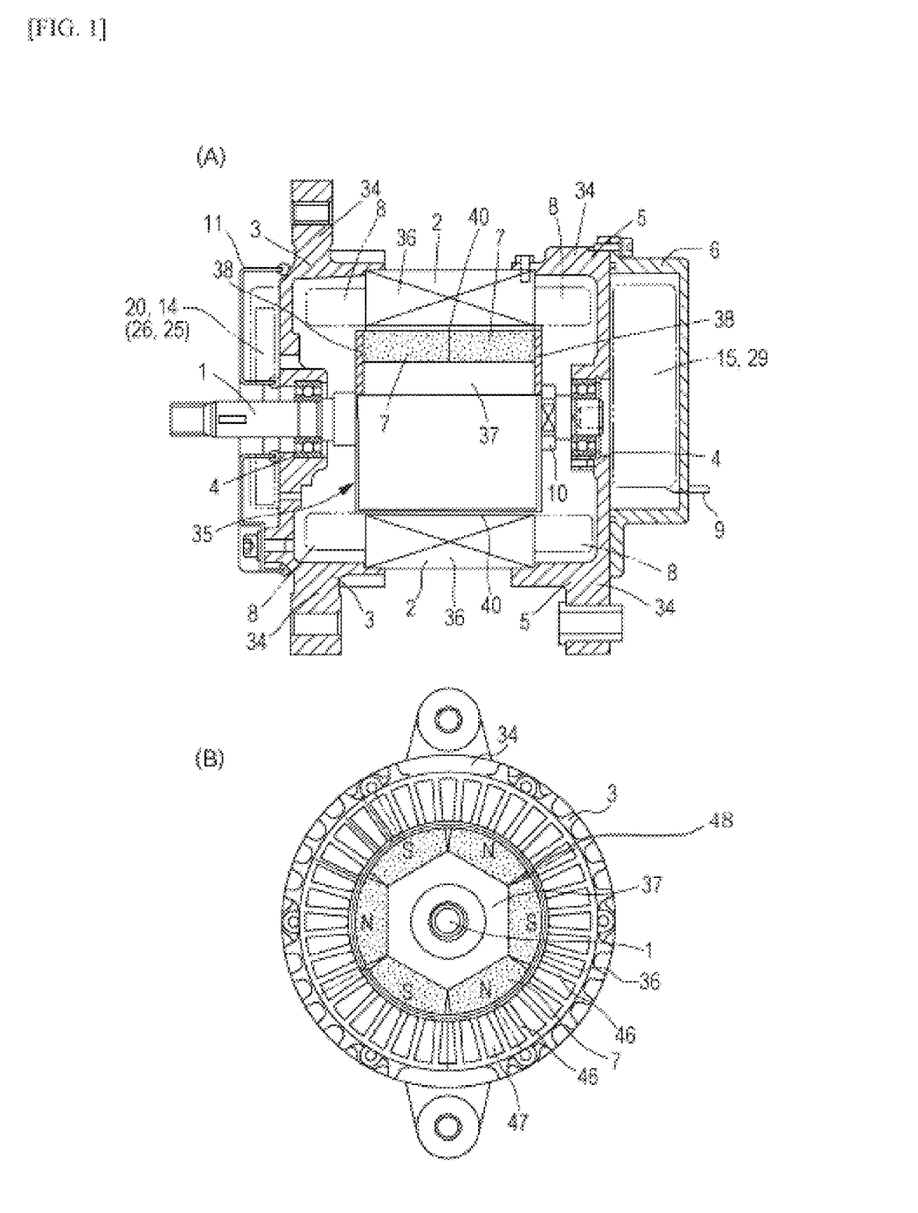
FIG. 1 is a front view (A) and side view (B) and the structure of generator in accordance with the present invention is shown in this picture.

The one of embodiments of the permanent-magnet AC generator is shown as FIG. 1 in accordance with the patent invention. The embodiment of the permanent-magnet AC generator is having 6 poles and three phases and the AC generator as shown in FIG. 1 is comprised of stator housing 34 which is pair of housing halved housing 3 and 5, a rotor shaft 1 supported for rotation in the housing 3 and 5 by means of pair of axially opposite ball bearing 4, a rotor 35 of multi-polar permanent magnet member 7 in which more than one pair of permanent magnet pieces is arranged circumferentially around the rotor shaft 1, a stator 2 arranged around the outer periphery of the rotor 35. The stator 2 is composed by stator core 36 and rolled up by electromagnetic coils 8 arranged in stator core 36.

An equipment of driving such as pulley is fixed to the end of rotor shaft 1 driven by driving force through input gear etc. which the power come from engine, wind turbine and water turbine. The rotor shaft 1 is composed of a magnetic permeable member 37 arranged on the rotor shaft 1 and the permanent magnet member 7 of more than one permanent magnet pieces are mounted axially. Furthermore, around the outside periphery of the permanent magnet member 7 there is provided a first reinforcing member 40. The rotor 35 which is constructed by permanent magnet member 7 and magnetic permeable member 37 is clamped between axially opposite backing plate 38 and flange and fixed in rotor shaft 1 by nut such as tightening tools in integration. In the AC generator, rectifier 15, 29 is arranged in the rear housing 5 and the terminal of choke coils 20, 14, 25, 26 are set up in outer side of the front housing 3. The choke coils are located at the outside of the stator, which is meat that the choke coils are disposed at a position not interlinked with a magnetic flux of the rotor. In order to fix and mold the stator coil 8 in to the stator coils 36, isolation paper are provided in the slot of stator.

Figure 2:
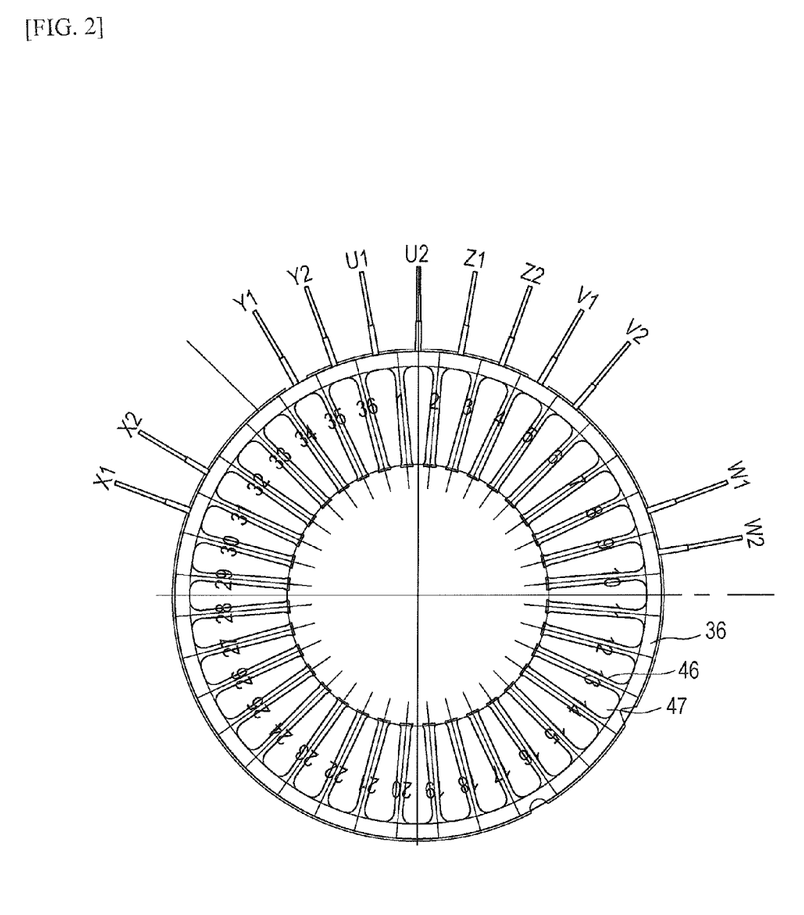
FIG. 2 is winding method wound into the slots of the stator in accordance with the patent invention.

Here, in the stator core 36 in accordance with this invention, the teeth 46 corresponded to the pole of rotor 35 is provided with the number of the teeth being more than 3 and integral multiple of more than 2. Namely, the number of teeth 46 corresponded to one phase in single phase generator are integral multiple of more than 3 namely being 3, 4, 5, 6, . . . n because of one phase and in the generator with double phases the number of teeth are 4, 6, 8, 10, . . . n furthermore in the generator with three phase, the number of teeth are 6, 9, 12, 15 . . . n because of three phases and in the generator with 6 phases, the number of teeth are 12, 18, 24, 30, . . . n because of six phases. In addition, it is limited to increase the number of teeth 46 in remaining the small size of generator. Then, even if the teeth 46 corresponded to the pole are make the number increase than existing stator core, for example the number of teeth in the single phase generator having 3 or 4 teeth is nice consisting and in the case of double phases generator, the number of teeth with minimum number which is double of phase number is nice consisting. For example, in the case of embodiments of 6 pole and 3 phase AC generator, the total teeth number are 36 being 6 teeth per one pole are provided which is shown in FIG. 1(B), and FIG. 2. Still more, minimum teeth number 3 which is mentioned above on the teeth 46 in the single phase AC generator is need number for realizing that the two windings of stator wound into the teeth which is corresponded to one magnetic pole by short pitch winding with the teeth and by shifted one tooth at least and the winding is provided as winding angle occupied by the plurality of winding is corresponded to pole angle. In the case of generator having double phases, the number of teeth 46 of stator which is corresponded to the pole of rotor is the integral multiple of more than 2 which is phase number, that is nice condition, moreover, whole number doubled phases number and when the teeth has more than multiple phases number, winding corresponded to the pole of rotor are inserted to all of the slot of stator.

It is possible to realize the invention that the number of shifting teeth 46 wound by the plural windings corresponded to one pole of magnet member is more than one tooth. However, when the shifting number of teeth is increased in the teeth 46 corresponded to the pole of rotor, the number of teeth 46 wound by short pitch winding decrease, it is no nice consisting. For example, in the case of the generator with six teeth/one pole and two phases, and two kinds of windings are wound in striding across five teeth and shifted one tooth shown in FIG. 3, the teeth 46 wound by first winding coil 19 are five teeth which is 1, 2, 3, 4, 5, which number are given in the teeth in order to identify the teeth position shown in FIG. 2 and FIG. 3, and the teeth wound by second winding are five teeth which is 2, 3, 4, 5, and 6, moreover, the winding angle occupied by plurality of winding which are first coil 19 and second coil 24 (the angle is meant that the total slot angle from the begin of winding in first coil to the end of winding in second coil, and the total winding angle is 180 degrees electric angle.) are corresponded to pole angle (180 electric angle). In addition, in the case of two teeth shifting and winding in striding across five teeth which is no shown in drawing, the second winding stride the five teeth which number are 3,4,5,6 and 7, as the result, the second winding is wound in striding across the number 7 tooth which is corresponded to different pole. In the case, the magnetic flux of S pole flow into the number 7 tooth, and total magnetic flux flown into the windings is canceled out. Therefore, in order to wind up the windings into same number of teeth and by shifted two teeth position, which is corresponded to pole of rotor, first windings is wound into the four teeth of number 1, 2, 3, and 4 and second coils is wound into the four teeth of number 3, 4, 5, and 6 which is wound in striding across four teeth, as the result, it is difficult to avoid reducing the magnetic force because of reduction of the number of striding teeth and the slot not be able to insert the winding break out, it is disagreeable consisting. Then, the method of windings wound by shifted to one tooth position is appropriate. However, it is not only way to use the winding method of shifting one tooth, in order to increase the power as it was remained the small size of generator.

In the stator coil 8, the plurality windings wound by short pitch winding with the teeth, wound by shifted the tooth from beginning of winding each other and the winding angle occupied by the plurality of winding is corresponded to one magnetic pole. Namely, the invention is intended to realize increasing the power by using following law that as current produced in the each winding wound into the teeth 46 corresponded to the one pole, shifted one tooth at least and short pitch winding with the teeth, the current generated in each winding are added together. By this reason, the number of windings wound by shifted the tooth is better to be consisted by two or more than three windings, it is nice condition. In addition, magnetic flux flow into the teeth 46 wound the windings from the magnet member of the pore, then when the number of teeth 46 wound the windings is reduced, magnetic force reduce and the electromotive voltage reduce. Therefore, it is agreeable that the number of teeth 46 wound the windings is not reduced so much, and the number of windings should be increased, for example, the teeth wound by two or three kind of windings is better than single windings because the electric power added together from plurality windings increase. In the case of generator with more than double phases, windings after phase of the first phase with plurality windings is installed the position delayed the angle divided electric 360 degrees by phase number, it is nice condition.

The number of windings, the number of shifting teeth wound the winding, and the number of teeth 46 stridden are no restricted to specific value, however the number of the teeth being the integral multiple of more than 2, and the windings corresponded to one pole has same number of the integral number, still more, the windings is wound by striding the teeth 46 which is subtracted one from the number of teeth corresponded to one pole of rotor, which are wound at a short pitch with the teeth, shifted one tooth, it is nice condition. In the case, winding coils are inserted in all of the slots uniformity.

To give an actual example, in the case of single phase generator, (a) windings wound into three teeth corresponded to one pole, stridden two teeth, shifted one tooth and having two windings are inserted into all slots. In the case, although, the number of windings inserted to slots, are different, the effect of power increasing can be realized. (b) windings wound into four teeth corresponded to one pole, stridden three teeth, shifted one tooth and having two windings are inserted into slots. In the case, although, there is slots corresponded one pole without windings, one of the slots inserted two windings and other slots inserted one winding, which case is unbalanced because of un-uniformity of number of windings, however the power is increased. (c) windings wound into four teeth corresponded to one pole, stridden three teeth, shifted one tooth and having three windings are not inserted into all slots. In the case, although, the windings are not inserted to all of slots, however the power is increased. (d) windings wound into three teeth corresponded to one pole, stridden three teeth, shifted one tooth and having three windings are inserted into the all slot. In the case, although, windings number increase two which is double number compared with those of other slots and it is imbalance winding method which the number of inserted windings is different from the slots however the power is increased which is main purpose is achieved. (e) windings wound into six teeth corresponded to one pole, stridden five teeth, shifted one tooth and having two windings are not inserted into all slots. In the case, the power is increased.

Next, talking about the generator with three phases, (f) windings wound into six teeth corresponded to one pole, stridden five teeth, shifted one tooth and having two windings are inserted into all slot which is shown in for the example of an enforcement. In the case, windings are inserted to all of slots uniformity, and the power increase twice. (g) windings wound into nine teeth corresponded to one pole, stridden seven teeth, shifted one tooth and having three windings are inserted into all slots. (h) windings wound into twelve teeth corresponded to one pole, stridden nine teeth, shifted one tooth and having four windings are inserted into all slots. In the case, as the windings inserted to all of slots, and number of windings is same, double or triple power is increased which is same result shown in FIG. 3. Namely in the case of explaining by use of the equation 1 in the nine teeth shown in (g), if the magnetic flux is in proportion to number of teeth, electromotive voltage is shown in next equation $E1=7/9 \cdot E$. However as windings are three, the electromotive voltage increases as shown next equation $E2=3 \times 7/9 \cdot E$, then increase of power is 2.3 times from the calculation. Moreover in the case of twelve teeth shown in (h), electromotive voltage is calculated by next equation, $E2=4 \times 9/12 \cdot E$ then the power increase 3 times from the calculation. However, in the case of (f), as the power increase 1.7 times from the calculation, the power was increased double in the experiment because as the magnetic flux flown into the side of teeth 46 is small than the flux flown into the center of teeth, the power reduction is small in the case of using windings wound by short pitch winding. As the result, the power is increased 2.3 times in the case of (g) and the power is increased 3 times in the case of (h) which is estimated.

Moreover, in the case of generator with two phase, (i) windings wound into four teeth corresponded to one pole, stridden three teeth, shifted one tooth and having two windings, (j) windings wound into six teeth corresponded to one pole, stridden four teeth, shifted one tooth and having three bundles, (k) windings wound into eight teeth corresponded to one pole, stridden five teeth, shifted one tooth and having five windings are nice winding methods.

Moreover, in the case of 6 phases generator, (l) windings wound into twelve teeth in one pole, stridden eleven teeth, shifted one tooth and having two windings (m) windings wound into 18 teeth corresponded to one pole, stridden ten teeth, shifted one tooth and having three windings, (n) windings wound into 24 teeth corresponded to one pole, stridden nine teeth, shifted one tooth and having four windings are nice consisting, and the windings are inserted to all of slots with same number of windings and uniformity. As the result, it is look forward to increasing double of power which result is same as the example shown in FIG. 3.

Figure 3:
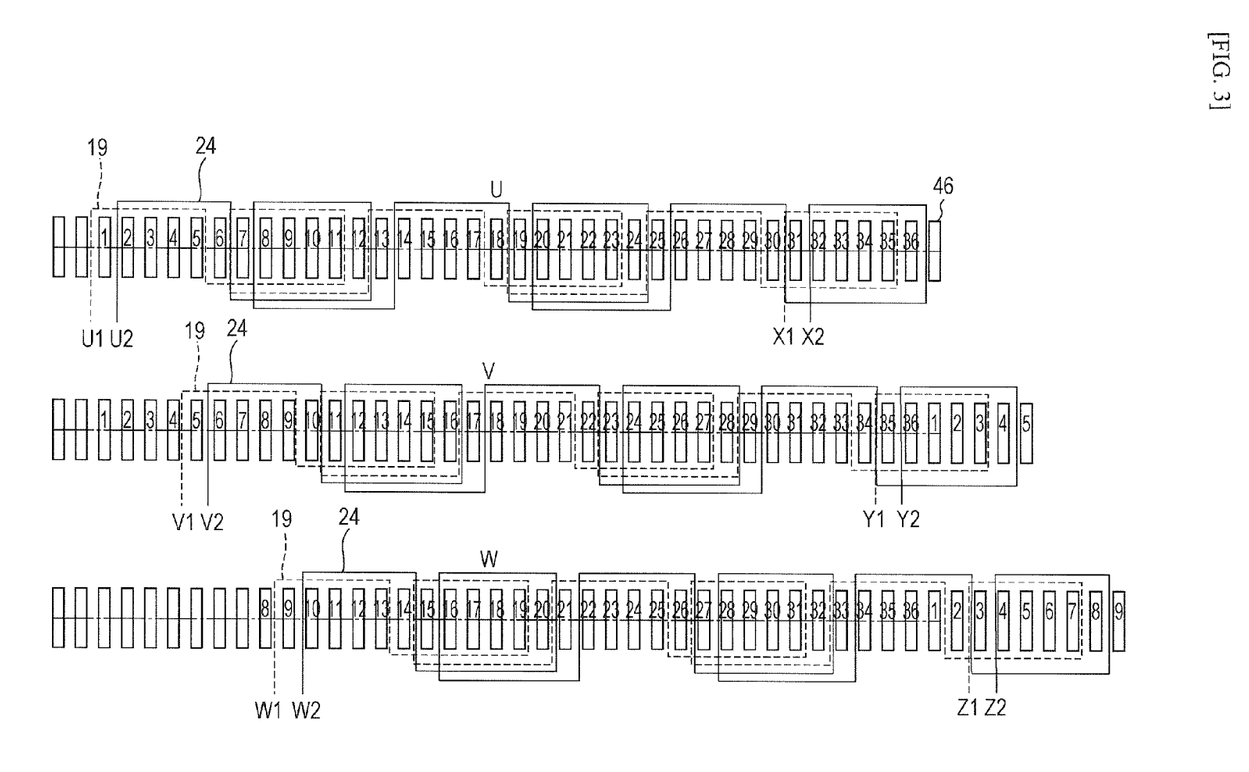
FIG. 3 is the winding method shown in the deployed picture of teeth and slots which has cylindrical shape.

The contents of winding method in the permanent-magnet AC generator is explained in detail by using FIG. 2 and FIG. 3, which is shown in the example of the generator with three phases, 6 poles and 6 teeth per one pole. Furthermore, marks 1, 2, 3, . . . 36 are continuance number appended to identify the position of tooth 46 in the stator 36 and the teeth 46 corresponded to the magnet member of N pole are 1 to 6, still more, the teeth 46 corresponded to the magnet member of S pole are 7 to 12, namely 6 teeth are corresponded to the each pole. In the case of stator core 36, for example, the first winding 19 of U phase is wound from terminal U1 by clockwise for constituting N pole which is stridden teeth 1 to 5 and next the winding is wound by counterclockwise for constituting S pole which is stridden teeth 7 to 11, which is one set winding. Still more, the windings is continued to wind for next stage as second set which winding is wound from first set by clockwise for constituting N pole which is stridden teeth 13 to 17 and next winding is wound by counterclockwise for constituting S pole which is stridden teeth 18 to 23, after that, the winding is continued to next stage as third set which winding is wound from third set by clockwise for constituting N pole which is stridden teeth 25 to 29 and next coils is wound by counterclockwise for constituting S pole which is stridden teeth 31 to 35, as the result, third sets windings wound by short pitch winding is connected in series and connect to the terminal X1. Furthermore, mark 47 shown in FIG. 2 is slot.

In addition, second winding 24 of U phase is wound from terminal U2 by clockwise for constituting N pole which is stridden teeth 2 to 6 and next winding is wound by counterclockwise for constituting S pole which is stridden teeth 8 to 12, which is first set winding. Still more, the winding is continued to next stage as second set moreover windings is wound from first set by clockwise for constituting N pole which is stridden teeth 14 to 18 and next winding is wound by counterclockwise for constituting S pole which is stridden teeth 20 to 24, after that, the winding is continued to next stage as third set windings wound from second set by clockwise for constituting N pole which is stridden teeth 26 to 30 and next windings is wound by counterclockwise for constituting S pole which is stridden teeth 32 to 36, as the result, the third set winding is connected in series and connect to the terminal X2. When the windings 19 and 24 are wound by the method shown in above paragraph, as the first winding 19 shift one tooth (electric angle is 30 degree (180 degrees/6 teeth)) from second winding 24, an electromotive voltage generate independently in the first coil 19 and second coil 24, still more, when the powers are added, the electric power of the generator increase double.

In addition, the windings after phase of first phase with plurality windings is installed the position delayed the angle divided electric angle 360 degrees by number of phase each. Therefore, the windings of V phase start from the slot position delayed electric angle 120 degrees of U phase. Namely, the first windings 19 of V phases is wound from terminal V1 by clockwise for constituting N pole which is stridden teeth 5 to 9 and next winding is wound by counterclockwise for constituting S pole which is stridden teeth 11 to 15 which is first set winding. Still more, the windings is continued to wind for next stage as second set moreover windings is wound from first set by clockwise for constituting N pole which is stridden teeth 17 to 21 and next windings is wound by counterclockwise for constituting S pole which is stridden teeth 23 to 27, after that, the coils winding is continued to next stage as third set windings is wound from second set by clockwise for constituting N pole which is stridden teeth 29 to 33 and next windings is wound by counterclockwise for constituting S pole which is stridden teeth 35 to 3, as the result, third sets windings wound by short pitch winding is connected in series and connect to the terminal Y1. In addition, second windings of V phase is wound from terminal V2 by clockwise for constituting N pole which is stridden teeth 6 to 10 and next windings is wound by counterclockwise for constituting S pole which is stridden teeth 12 to 16, which is one set winding. Still more, the windings is continued to next stage as second set moreover windings is wound from first set by clockwise for constituting N pole which is stridden teeth 18 to 22 and next winding is wound by counterclockwise for constituting S pole which is stridden teeth 24 to 28, after that, the coils winding is continued to next stage as third set windings is wound from second set by clockwise for constituting N pole which is stridden teeth 30 to 34 and next coils is wound by counterclockwise for constituting S pole which is stridden teeth 36 to 4, as the result, third sets windings of V phase wound by short pitch winding is connected in series and connect to the terminal Y2.

The windings of W phase start to wind from the teeth 10 position delayed electric angle 120 degrees of V phase. Namely, the first windings of W phase is wound from terminal W1 by clockwise for constituting N pole which is stridden teeth 10 to 13 and next windings is wound by counterclockwise for constituting S pole which is stridden teeth 15 to 19 which is one set winding. Still more, the windings is continued to next stage as second set moreover windings is wound from first set by clockwise for constituting N pole which is stridden teeth 21 to 25 and next windings is wound by counterclockwise for constituting S pole which is stridden teeth 27 to 31, after that, the windings is continued to next stage as third set windings is wound from second set by clockwise for constituting N pole which is stridden teeth 33 to 1 and next coils is wound by counterclockwise for constituting S pole which is stridden teeth 3 to 7, as the result, third sets windings of W phase wound by short pitch winding is connected in series and connected to the terminal Z1. Second windings 24 of W phase is wound from terminal W2 by clockwise for constituting N pole which is stridden teeth 10 to 14 and next windings is wound by counterclockwise for constituting S pole which is stridden teeth 15 to 19, which is first set winding. Still more, the windings is continued to next stage as second set windings is wound from first set by clockwise for constituting N pole which is stridden teeth 22 to 26 and next coils is wound by counterclockwise for constituting S pole which is stridden teeth 28 to 32, after that, the windings is continued to next stage as third set moreover windings is wound from second set by clockwise for constituting N pole which is stridden teeth 34 to 2 and next windings is wound by counterclockwise for constituting S pole which is stridden teeth 4 to 8, as the result, the second windings of W phases is wound by short pitch winding is connected in series and connected to the terminal Z2.

Figure 4:
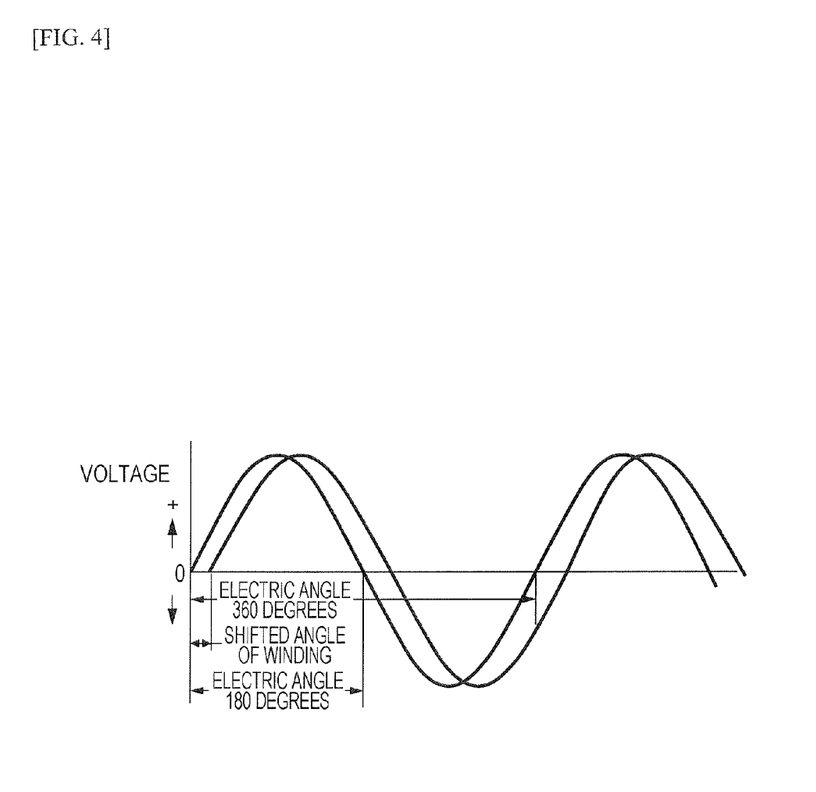
FIG. 4 is the voltage waves generated in the windings in accordance with the patent invention.

The wave of electromotive voltage generated in the generator is shown in FIG. 4. As the electromotive voltages generated by first windings and second windings is shifted 30 degrees of electric angle, the circular current is produced between first and second windings in the case of connecting both of terminals because of difference of voltage, and the temperature of the windings increase because of heat generation.

Then, the AC current of first windings of U, V and W phase are rectified by bridge diodes and changed to DC current, and the AC current of second windings are also changed to DC, as the result, the difference of the voltage between first and second windings disappear and it is possible to increase the electric power according to join both currents. As the electric power become double compared with conventional system having same size, the compact and high power generator can be able to realize.

Figure 5:
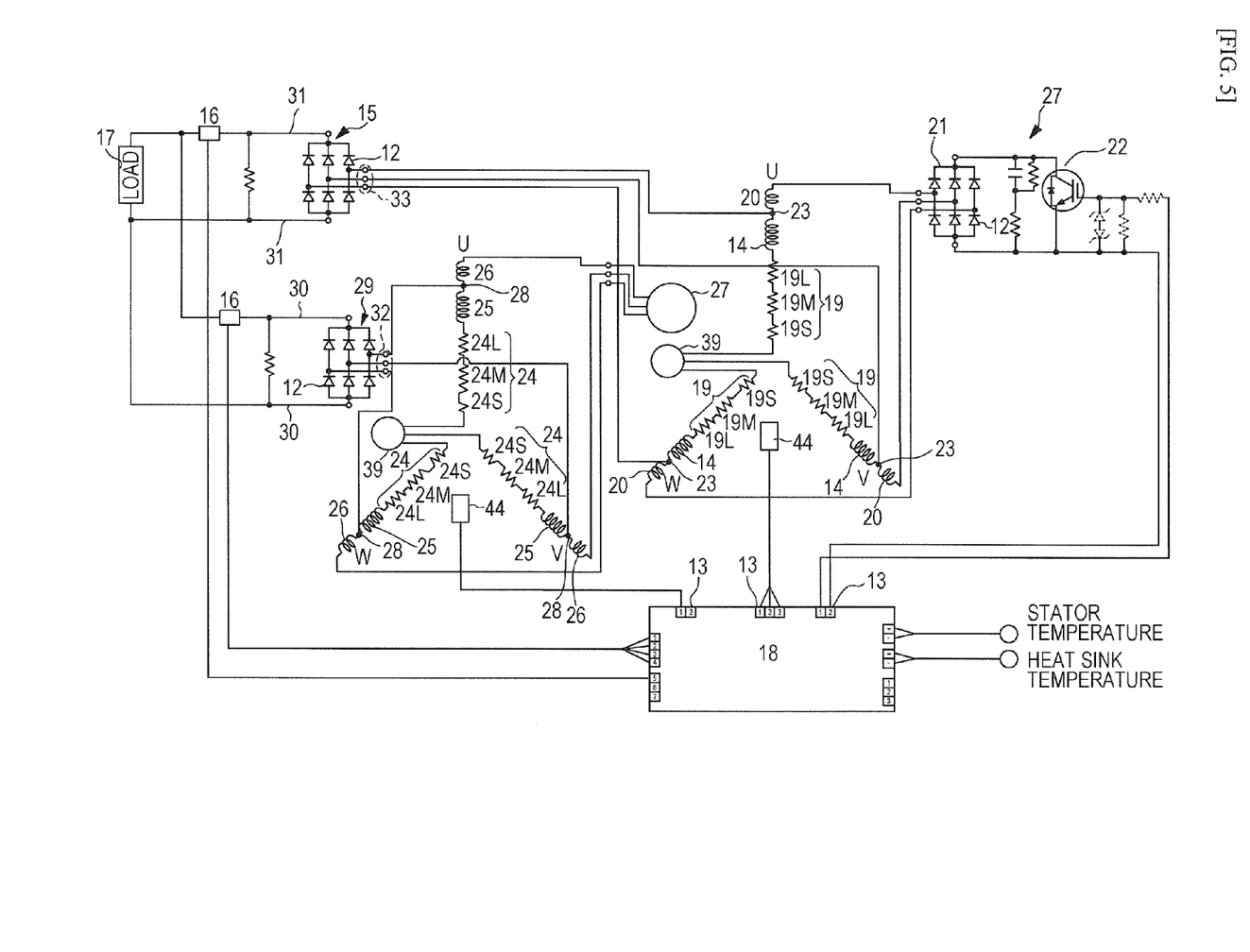
FIG. 5 is the control circuit in order to join to the electric power having different phases produced in the different windings.

The example of an electric circuit for the AC generator having three phases and 6 poles (windings wound into six teeth corresponded to one pole, stridden five teeth, shifted one tooth, short pitch winding and having two windings) is shown in FIG. 5, which generator is shown in FIG. 2 and FIG. 3. The circuit was invented by this inventor for controlling constant voltage and registered for the patent of JP No. 4913234 in Japan and the circuit can be used for controlling voltage in the conventional permanent generators. In the example of the enforcement, first, second or third windings is connected in series in each phases windings severally consisted in stator coils 8 shown in the patent JP No. 4913234, and neutral switches (no picture) are set up on each joining points of each windings of phase. Generally, the winding number of windings of three phases AC generator with 6 poles are 150 or 180 turns per each phases, then, the windings of 19L wound by short pitch which is corresponded to each pole, is wound 15 turns per one pole and the total winding number of 19L is 90 turns, windings of 19M is wound by 10 turns per one pole and the total winding number is 60 turns and windings of 19S wound by 5 turns per one pole and total winding number is 30 turns moreover those windings are connected in series and set up the neutral switch (no picture) on joining points, furthermore, three windings which is total winding number 180 ((15+10+5)×6, total winding number 90 ((10+5)×6) and total winding number 30(5×6) can be changed by controlling of the neutral switches, namely, windings with 30 turns is used for high speed, the winding with 90 turns is used for medium speed, and the winding with 180 turns is used for low speed. Still more, it is better construction that three windings having same winding number are installed, connected in series and joined windings mediated by neutral switches. In addition, it is possible that two windings having different turn numbers are connected through the neutral switches in series and the windings can be changed for high speed or low speed. And the first windings is divided on the each windings 19 corresponded to one pole which is wound by short pitch with the teeth and set up the neutral switch on the each junction of poles then the controller control the length of the windings divided three windings for high, medium and low speed, still more, the method is used for the second windings 24 (it is same as the third winding) as same as first windings.

First winding 19 is connected by three windings having different length in series which is 19L, 19M and 19S and neutral switch are set up on the halfway joining points, (no picture) still more, large choke coils 14 and small choke coils 20 are connected on the following side and three phase bridge diode 21 and the power transistor 22 are connected on the following side of choke coils in order to control the voltage of load side constantly. Then, the divergence points 23 are installed on each terminal of phases between large choke coil 14 and small choke coils 20, the wires connected with the divergence points are joined with rectifier 15 for rectifying from AC current to DC current and the power is flown to load 17 through read wire 31. As the stator windings is wound by first winding 19 and second winding 24 in divide, second winding 24 is connected by three windings having different length in series which is 24L, 24M and 24S, still more, large choke coils 25 and small choke coils 26 connected on the following side and the switching system 27 which are consisted by three phase bridge diode (no picture) and the power transistor (no picture) connected on the following side of choke coil in order to control the voltage of load side constantly which is same construction as switching systems 27 constituted by the first winding 19, three phase bridge diode 21 and power transistor 22. Then, the divergence points 28 are set up on each terminal between large choke coils 25 and small choke coils 26, the wires connected with the divergence points are joined with rectifier 29 for rectifying from AC current to DC current and the power is flown to load 17 through read wire 30. The electric power generated in first and second windings are joined in the wires connected with after the rectifiers. Though it is explained on the U phase, the consisting of circuit on the V and W phases are same as U phase. Mark 44 shown in the picture is censer of speed and pole position, and mark 16 is voltage censer moreover, mark 18 is controller and mark 13 is terminal for connecting.

It is admitted that AC current is changed to DC current by the rectifier used transistor bridge circuit and controlled the voltage constantly by switching of transistors, after the changing to DC current, both power are joined together.

In addition, in the case of using the generator for motor, the controller make the current flow to negative direction into the windings wound into five teeth corresponded first windings 19 of U phase which is occupied electric angle 150 degrees after that the controller make the current flow to negative direction into second windings 24 shifted one tooth delayed electric angle 30 degrees from first windings for period of electric angle 150 degrees, which is corresponded to 6 teeth of N pole in U phase. The controller make the current flow to negative direction for period of electric angle 150 degrees into first windings 19 of V phase which delayed electric angle 120 degrees from the windings 19 of U phase moreover the controller make the current flow to negative direction into second windings 24 for a period of electric angle 150 degrees delayed electric angle 30 degrees from first windings. W phase is same as U, V phase, namely, the controller make the current flow to negative direction for period of electric angle 150 degrees into first windings 19 of W phase which delayed electric angle 120 degrees from the windings 19 of V phase moreover the controller make the current flow to negative direction into second windings 24 for a period of electric angle 150 degrees delayed electric angle 30 degrees from first windings.

The combined magnetic flux which produced by flowing current into the windings 19 of first winding and windings 24 of second windings are acted for the period of electric angle 120 degrees and pull the magnetic member 7 of rotor strongly.

The driving force of motor grow by the next principle that the controller make current flow to negative direction and into a little forward position corresponded to N pole of rotor in order to produce S pole in the stator side and the S pole in the stator side pull the N pole of the magnetic member, as the result, strong driving force grow in the rotor. In the S pole of the rotor side, N pole is produced in the stator side then the pulling force act between stator and rotor and driving force is produced in the rotor. The timing of flowing electricity into the windings is decided by the position censer located it in the rotor, furthermore, controller is adjusting the timing to forward side at high speed in order to get best timing.

Figure 6:
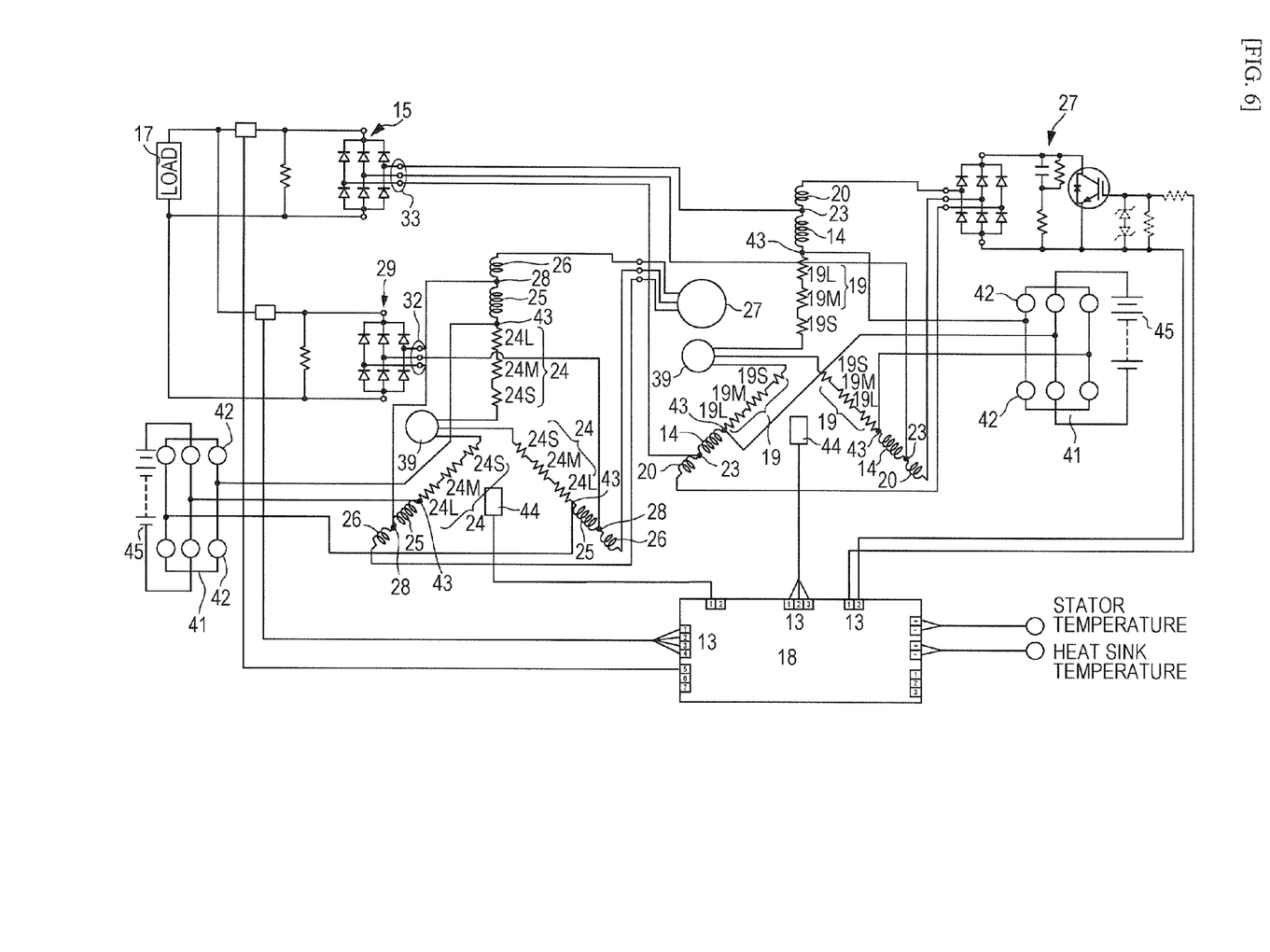
FIG. 6 is the control circuit which made the windings of each phase shifted the winding angle flow current, and made the controller join the magnetic force, in the case of using the generator for a motor with three phases in order to increase the driving torque.

The circuit in the case of using for the motor is shown in FIG. 6. The controller 18 switch off the switch 32 and 33 which are installed in generator side, and the neutral switch 39 is switched on then the current flown from battery 45 which is a power source and flow to the first winding 19 of U, V, and W phases through the three phase bridge circuit 41 and terminal 43 set up on the connecting point between the choke coil 14 and windings 19, still more, the wave shape of current is permitted sine or rectangular wave. The transistor 42 can control the wave shape having sine or rectangular shape by the controller 18. In the case of flowing the current having rectangular shape, the composed magnetic flux produced by three windings of U, V, and W phases form a shape like sine wave therefore it is better to make rectangular wave in order to produce the controller simply.

Furthermore, a form mentioned above is one of nice example talked about this invention, it is not limited by this example and there are many deformation examples which no stray from the gist of the invention. For example, a case constituted by two power windings which are first and second windings is explained in the enforcement example mainly, however it is no limited for the examples, namely it is possible to use three windings which are first, second, and third winding or four kind of windings or more than four. Still more, as the magnetic flux flow into the teeth 46 wound windings from the magnetic member of rotor, the magnetic flux intersected to the windings reduce and electromotive voltage also reduce when the number of teeth 46 reduce. Then, it is better to use two or three kind of windings and add together those electric powers without reducing the number of teeth 46 in order to increase the power. Still more, it is better to shift one tooth for shifting the phase angle between first windings and second windings or second and third windings, however, it is no limited only one tooth shifting, in some cases, two teeth shifting more than one tooth shifting are used.

Figure 7:
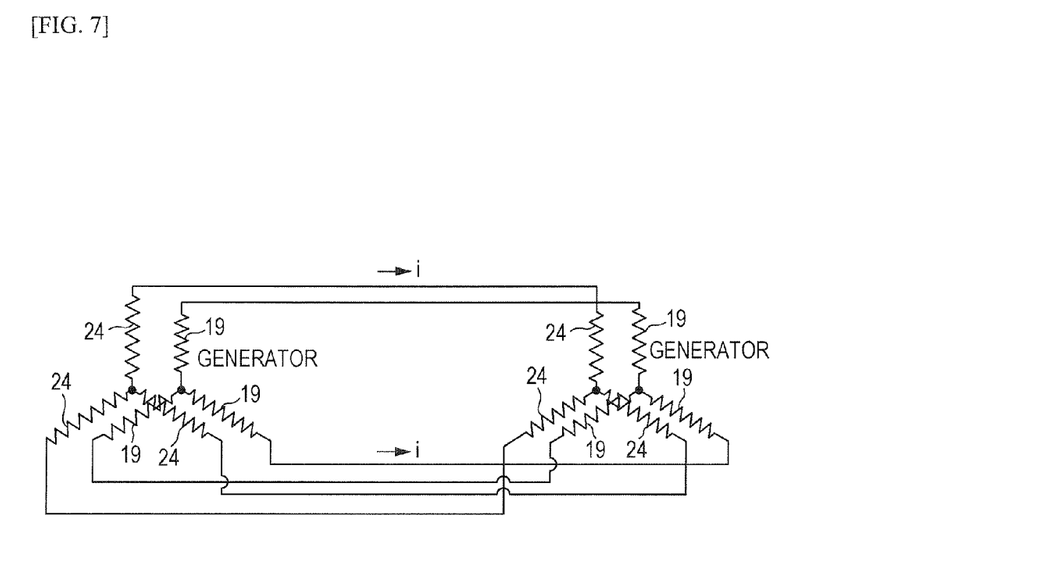
FIG. 7 is one of the enforcement of control circuit which the permanent magnet generator with three phases are connected with the permanent magnet motor with three phases directly.

In the example of the enforcement, the case of joining the DC current after changing to DC current from AC current in order to increase the power by connecting two wires. However, in the case of using same type of windings on the generator and motor, it is possible to join the three power terminals directly, and the controller can made the motor drive without change to DC current from AC current. For example, in the case of the motor wound by short pitch and shifted one tooth and having two windings, the power windings are joined between first windings of motor and first windings of generator, and between second windings of motor and second windings of generator directly which is shown FIG. 7. In this case, it is possible to increase the power of the motor without heat up because of no flowing circulation current.

Figure 8:
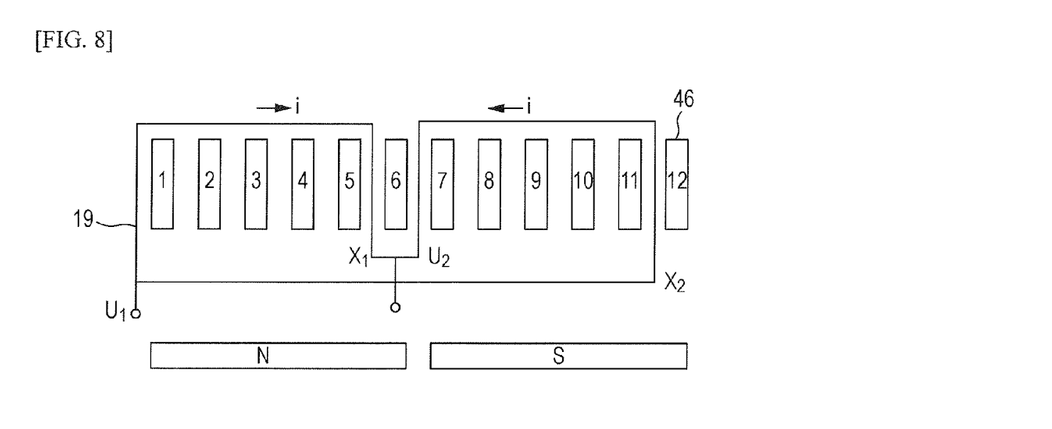
FIG. 8 is one of the enforcement of permanent magnet generator with 3 phases and it is shown for one example of circuit that the first winding is connected in parallel condition.
Figure 9:
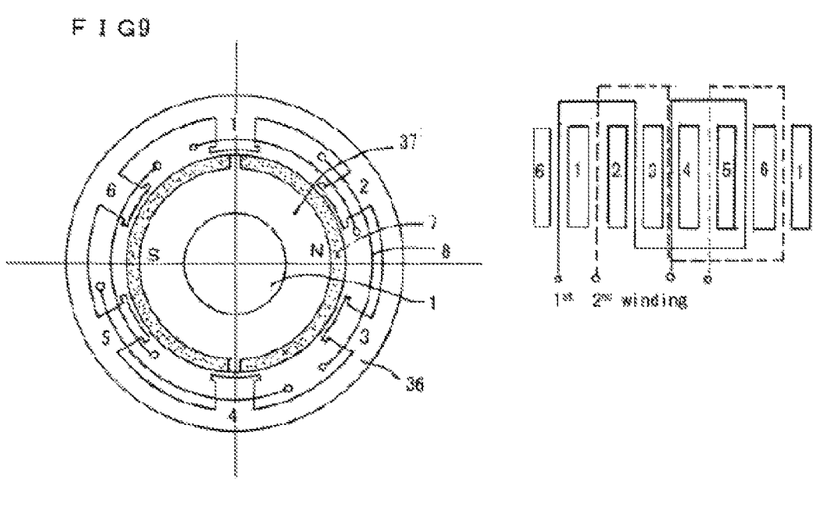
FIG. 9 is a single phase generator, the teeth of stator corresponding to a magnetic pole of rotor are three, and the windings of stator are provided as first and second windings, still more, the coils are wound by shifting one tooth and short pitch winding with the teeth.

Furthermore, although the case which the first windings 19 and second windings 24 are connected in series is explained for the example of the enforcement in the form of the invention, however, it is no limited above case, it is possible to use the two windings connected in parallel. For example, although windings is constituted by a pair which is connected the winding for N pole and the winding for S pole, windings corresponded to N pole and S pole is wound independently, and connected the terminal U1 and X2, still more connected the terminal U2 and X1 and it is possible to use the windings for parallel connection which is shown in FIG. 8. Still more, winding method is explained by using FIG. 3. The teeth 46 which is constituted tooth 1 to 5 wound by clockwise for N pole, and the teeth 46 which is constituted teeth 7 to 11 wound by counterclockwise for S pole, then it is named first windings, furthermore, the teeth 46 which is constituted teeth 2 to 6 wound by clockwise for N pole, and the teeth 46 which is constituted teeth 8 to 12 wound by counterclockwise for S pole, then it is named second windings, the teeth 46 which is constituted tooth 13 to 17 wound by clockwise for N pole, and the teeth 46 which is constituted teeth 19 to 25 wound by counterclockwise for S pole, then it is named third windings, and the teeth 46 which is constituted tooth 25 to 29 wound by clockwise for N pole, and the teeth 46 which is constituted teeth 31 to 35 wound by counterclockwise for S pole, then it is named forth winding coil. Moreover, when the terminals of pair windings are connected in parallel the generator having large current even if low voltage can be realized.

It is needless to say that the winding method of the invention can be applied for the IPMSM (Interior Permanent Magnet Synchronous Motor) motor.

The winding method of generator invented by the inventor can be applied for automotive, wind turbine and water turbine generator required to reduce the size.

The invention claimed is:

1. A permanent-magnet AC generator, comprising:
   a rotor shaft rotatably supported by a housing;
   a rotor fixed to the rotor shaft, comprising:
      a magnetic permeable member surrounding the rotor shaft; and
      a plurality of permanent magnet members disposed on an outer portion of the magnetic permeable member;
   a stator disposed at the outside of the rotor, comprising:
      a plurality of teeth, a number of which face a number of poles of the rotor, the number of the teeth being more than 3 per each pole of the poles and an integral multiple of a phase number, the integral multiple being more than 2; and
      a plurality of windings which are wound around the plurality of teeth at a short pitch and shifted from each other; and
   a switching mechanism that controls a voltage to be constant,
   wherein the plurality of windings are shifted from each other such that a) the windings start and end at a different tooth in the plurality of teeth; b) the windings are wound around different sets of teeth; and c) a winding angle occupied by each of the plurality of windings based on a pole angle, wherein AC electric powers generated in the plurality of windings are rectified from AC to DC current in independent rectifiers,
   wherein the DC current is added together and used for power,
   wherein the generator has a plurality of phases,
   wherein the winding of the stator is related to the poles of the rotor, and
   wherein windings of a phase following the first phase are installed at the position delayed the angle divided electric angle 360 degrees by number of phase each short pitch winding have a winding pitch as short as 67 to 83 percent of pole pitch.

2. The permanent-magnet AC generator according to claim 1,
   wherein the generator comprises a plurality of phases, the teeth of the stator correspond to the poles of the rotor, the number of the teeth being the integral multiple of more than 2, and the windings correspond to one pole has same number of the integral number,
   wherein the winding is wound by striding the teeth which is subtracted one from the number of teeth corresponding to one pole of the rotor, which are wound at a short pitch with the teeth, shifted one tooth, and covering angle of the teeth which the plurality of windings are wound the teeth corresponding to a pole angle, and
   wherein the windings of a phase following the first phase with plurality of windings is installed the position delayed the angle divided electric angle 360 degrees by number of phase each.

3. The permanent-magnet AC generator according to claim 2, wherein the motor and the generator comprise 3 phase, wherein six teeth correspond to a magnetic pole of the rotor, wherein the coils of the stator correspond to one magnetic pole are provided first and second coil, wherein the winding is wound by striding five teeth, shifted one tooth and short pitch winding each other, wherein the angle occupied by the first and second winding corresponds to the angle formed by magnetic pole, wherein first and second winding of V phase are wound to behind electric angle 120 degrees from winding position of first and second coil of U phase and first and second winding of W phase are wound to behind electric angle 120 degrees from winding position of first and second windings of V phase.

4. The permanent-magnet AC generator according to claim 2, wherein the motor and the generator comprise 3 phase, wherein nine teeth correspond to a magnetic pole of the rotor, wherein the windings correspond to a magnetic pole of rotor comprise three pieces which are a first, a second and a third winding, wherein the winding is wound by striding seven teeth and then one tooth shifted to form the short pitch winding, wherein the angle occupied by the first, second and third winding corresponds to the angle formed by magnetic pole, wherein a first, second and third windings of V phase are wound to behind electric angle 120 degrees from winding position of first, second and third winding of U phase and first, second and third winding of W phase are wound to behind electric angle 120 degrees from winding position of first and second windings of V phase.

5. The permanent-magnet AC generator according to claim 1, wherein the generator is a single phase generator, three teeth of the stator corresponded to a magnetic pole of rotor, and the windings of the stator comprise first and second windings, and wherein the coils are wound by shifting one tooth and short pitch winding with the teeth.

6. The permanent-magnet AC generator according to any one of claims 1 to 5, wherein the current is controlled by a controller so as to be flown into the plurality of windings corresponded to one magnetic pole at the timing corresponded to shifting winding position of each coils and each phase position delayed from the before phase, then, the total magnetic force produced by the plurality of windings react to the magnetic force of permanent magnet and grow a large power for driving a motor, the large power having two or three times as large as conventional winding in motor.

7. A permanent-magnet AC generator, comprising:
a rotor shaft rotatably supported by a housing;
a rotor fixed to the rotor shaft, comprising:
  a magnetic permeable member surrounding the rotor shaft; and
  a plurality of permanent magnet members disposed on an outer portion of the magnetic permeable member;
a stator disposed at the outside of the rotor, comprising:
  a plurality of teeth, a number of which face a number of poles of the rotor, the number of the teeth being more than 3 per each pole of the poles and an integral multiple of a phase number, the integral multiple being more than 2; and
  a plurality of windings which are wound around the plurality of teeth at a short pitch and shifted from each other; and
a switching mechanism that controls a voltage to be constant,
wherein the plurality of windings are shifted from each other such that a) the windings start and end at a different tooth in the plurality of teeth; b) the windings are wound around different sets of teeth; and c) a winding angle occupied by each of the plurality of windings based on a pole angle, wherein AC electric powers generated in the plurality of windings are rectified from AC to DC current in independent rectifiers,
wherein the DC current is added together and used for power,
wherein the generator is a single phase generator, three teeth of the stator corresponded to a magnetic pole of rotor, and the windings of the stator comprise first and second windings, and
wherein the coils are wound by shifting one tooth and short pitch winding with the teeth.

8. A permanent-magnet AC generator, comprising:
a rotor shaft rotatably supported by a housing;
a rotor fixed to the rotor shaft, comprising:
  a magnetic permeable member surrounding the rotor shaft; and
  a plurality of permanent magnet members disposed on an outer portion of the magnetic permeable member;
a stator disposed at the outside of the rotor, comprising:
  a plurality of teeth, a number of which face a number of poles of the rotor, the number of the teeth being more than 3 per each pole of the poles and an integral multiple of a phase number, the integral multiple being more than 2; and
  a plurality of windings which are wound around the plurality of teeth at a short pitch and shifted from each other; and
a switching mechanism that controls a voltage to be constant,
wherein the plurality of windings are shifted from each other such that a) the windings start and end at a different tooth in the plurality of teeth; b) the windings are wound around different sets of teeth; and c) a winding angle occupied by each of the plurality of windings based on a pole angle, wherein AC electric powers generated in the plurality of windings are rectified from AC to DC current in independent rectifiers,
wherein the DC current is added together and used for power, and
wherein the current is controlled by a controller so as to be flown into the plurality of windings corresponded to one magnetic pole at the timing corresponded to shifting winding position of each coils and each phase position delayed from the before phase, then, the total magnetic force produced by the plurality of windings react to the magnetic force of permanent magnet and grow a large power for driving a motor, the large power having two or three times as large as conventional winding in motor.

* * * * *